(No Model.)
S. S. LEACH.
CONDENSER FOR STEAM ENGINES.
No. 516,210. Patented Mar. 13, 1894.
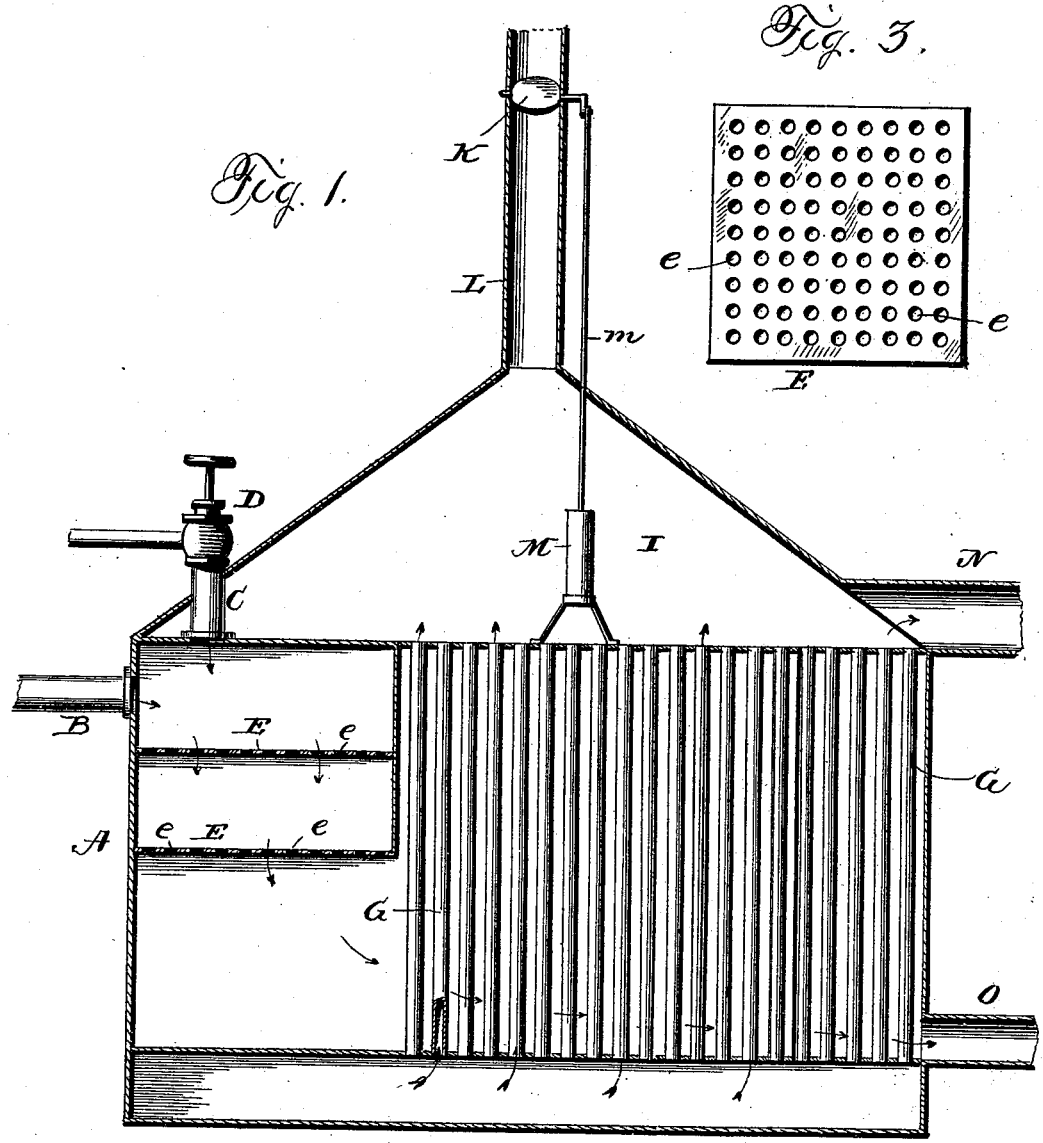
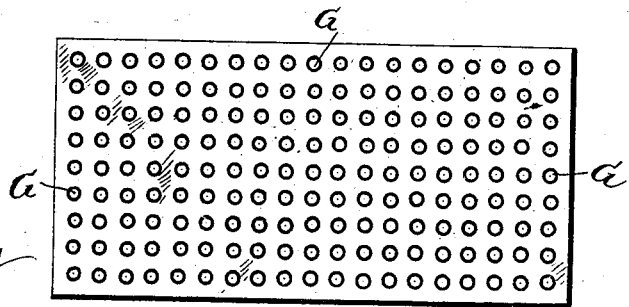
Witnesses
G. J. Williamson
A. L. Hough
Inventor
Samuel S. Leach,
By Franklin H. Hough,
his Atty.
THE NATIONAL LITHOGRAPHING COMPANY,
WASHINGTON, D. C.

UNITED STATES PATENT OFFICE.

SAMUEL S. LEACH, OF SANITARIA SPRINGS, NEW YORK.

CONDENSER FOR STEAM-ENGINES.

SPECIFICATION forming part of Letters Patent No. 516,210, dated March 13, 1894.

Application filed January 13, 1894. Serial No. 496,783. (No model.)

*To all whom it may concern:*

Be it known that I, SAMUEL S. LEACH, a citizen of the United States, residing at Sanitaria Springs, in the county of Broome and State of New York, have invented certain new and useful Improvements in Condensers for Steam-Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in condensers for steam engines, in which injection water is reduced, being injected into a chamber provided with a spray plate, where it comes in contact with the exhaust steam from the engine, thence coming in contact with cold air surface condensing tubes, and the provision of a heated fresh air chamber for containing the hot air, obtained heat of condensation, which may be utilized for draft purposes for furnaces and for any other suitable purposes.

My invention consists further in the provision of an automatically operated damper for the hot air chamber, which is regulated by a mercurial cylinder, so that the chamber may be kept at a desired temperature.

The invention consists further in the novel construction, combination and adaptation of the parts as will be hereinafter more fully described, and then specifically defined in the appended claim.

I fully illustrate my invention in the accompanying drawings, which form a part of this specification, in which like letters of reference indicate like parts throughout the several views, and in which—

Figure 1, is a vertical sectional view of my improved condensing chamber, air flues, injection gate and damper regulator. Fig. 2, is a detail of the cold air flues in cross section, and Fig. 3, is a similar section of the spray plates.

Reference now being had to the details of the drawings by letter, A, represents the condensing chamber, in one apartment of which enters the exhaust tube B, from an engine.

C is an injection water pipe provided with the gate D to regulate the supply of water to condensing plates E E, which are disposed in parallel planes at suitable distances below the inlet of the exhaust and injection tubes, and the provision of these plates which are perforated as seen at e, is to distribute over as wide a surface as possible, the injection water.

G are cold air flues which occupy a greater portion of the chamber, and convey the cold air from under the lower portion of the condensing chamber to the hot air receiving portion I.

K is a damper, located in a stack L, and is automatically regulated by the mercury cylinder M, through the medium of the connecting rod m. It will be readily seen that the temperature of the hot air chamber will be regulated by the expanding and contracting of the mercury, which actuates the damper.

N is a hot air draft pipe leading to a furnace.

At the lower portion of the condensing chamber is the pipe O, which conveys from the chamber the condensed water to an air pump.

The simplicity in construction and the great economy obtained in an invention of this nature will readily be seen by any one skilled in the art of steam engineering.

Having thus described my invention, what I claim to be new, and desire to secure by Letters Patent, is—

In a surface condenser for steam engines, the combination of a chamber containing a series of cold air flues forming a communication from an outer to an inner chamber of an exhaust pipe entering a compartment of the said chamber, an injection pipe, a series of injection water spray plates disposed near the exhaust and injection inlets, an automatically operated damper for regulating the temperature of the hot air chamber, by means of a mercury cylinder, and of suitable pipes for conducting the condensed water, and the hot air, substantially as shown and described.

In testimony whereof I affix my signature in presence of two witnesses.

SAMUEL S. LEACH.

Witnesses:
HENRY S. CARRINGTON,
CHARLES W. FORKER.